United States Patent Office 2,966,424
Patented Dec. 27, 1960

2,966,424

CRYSTALLIZATION OF BORON PHOSPHIDE

Robert A. Ruehrwein and Forrest V. Williams, Dayton, Ohio, assignors to Monsanto Chemical Company, St. Louis, Mo., a corporation of Delaware No Drawing. Filed Mar. 3, 1958, Ser. No. 718,462

4 Claims. (Cl. 117—47)

The present invention relates to the production of crystaline boron phosphide as a crystalline composition of matter.

It is an object of this invention to provide a process for preparing a new form of boron phosphide, BP, in the form of a well-crystallized, hard, thermally stable and chemically inert material. It is a further object to provide a highly refractory form of boron phosphide which is resistant to the attack of most chemicals and which may be prepared in the form of granular crystalline particles suitable for use as an abrasive material. It is a still further object of this invention to provide a process whereby amorphous boron phosphide may be transformed into the crystalline modification of this material. It is another object of this invention to provide a process by which shaped structures such as refractory articles, chemical apparatus, turbine blades and combustion fittings exemplified by combustion chambers and nozzles may be prepared from crystalline boron phosphide. Further objects and advantages of the invention will be apparent from the following description.

The amorphous form of boron phosphide is a well-known material. When the procedure set forth in J. W. Mellor, Comprehensive Treatise on Inorganic and Theoretical Chemistry, vol. pages 844–845 (1928), is carried out, the product which is obtained has been found to exist in the amorphous form.

However, this amorphous form is characterized by thermal instability. For example, when amorphous boron phosphide is heated in the open air to a temperature of about 200° C., the material spontaneously ignites and decomposes while undergoing combustion. It is obvious that such a material is of little utility as a construction material, particularly as an abrasive or refractory material.

It has now been found that a crystallization process for the transformation of amorphous boron phosphide to crystalline boron phosphide having a cubic structure may be carried out by heating the amorphous form to a temperature of at least 1,400° F., a preferred range being from 1,400° F. to 2,800° F. in an atmosphere in which there is present a partial pressure of elemental phosphorous of at least 10 mm. This process may be carried out in an electric tube furnace, for example, by heating the amorphous boron phosphide, either in the form of a powder or as a fabricated part while passing phosphorus vapor through the tube in sufficient proportion to maintain a partial pressure of at least 10 mm. of phosphorus. The phosphorus may be provided, if desired, by admixing the desired proportion of phosphorus with the amorphous boron phosphide before carrying out the present crystallization method. The phosphorus may also be introduced into the system by means of an inert carrier gas such as nitrogen or argon which is passed over a heated mass of phosphorus in order to carry such phosphorus vapor into contact with the amorphous boron phosphide which is to be transformed to the crystalline type. It is preferable, although not essential, that the atmosphere surrounding the boron phosphide be an inert gas, such as nitrogen, helium, argon, etc. However, relatively minor proportions of oxygen can be tolerated in the system. For example, if it is desired to obtain a particularly tough form of boron phosphide which can resist mechanical shocks in subsequent use, it is possible to obtain a controlled oxidation of the boron phosphide to various phosphates and oxides by controlling the amount of oxygen present in the system, thus permitting a regulated oxidation of the boron phosphide. Since such transformation to various phosphides and phosphates of boron results in the production of small amounts of a glassy material, this latter functions as a binder or matrix within the mass of boron phosphide particles. Such bonded boron phosphides having controlled proportions of non-stoichiometric phosphides, phosphates and oxides therein results in the production of extremely strong mechanical objects.

It is contemplated that the amorphous boron phosphide which is employed in the present invention may be provided as a fine powder or as crude lumps of technical grade boron phosphide. However, it is also contemplated that the amorphous boron phosphide may be formed into shaped objects or coatings, particularly by the use of a binder such as a silicate binder which is employed in suitable proportions, such as from 1% to 10% by weight. In this way it is possible to form bars, rings, tubes and other mechanical parts from the amorphous boron phosphide. Other shapes which may be thus fabricated for consequent transformation into crystalline boron phosphide include jet nozzles, venturi throats, exhaust deflectors, turbine blades and nozzles, as well as abrasive shapes, for example, grinding wheels and shaping tools.

The amorphous boron phosphide either in particulate or shaped forms (obtained by pressing, slip casting) is charged to a furnace or treating tube. An example of a shaped article to be utilized in the present method is a crucible which is formed from amorphous boron phosphide by pressing 10 mesh amorphous material into a wooden form to obtain the desired crucible shape. If desired, a binder, such as sodium silicate, may be employed in such forming operation. The shaped article of amorphous boron phosphide is then ready for the crystallization step conducted in an atmosphere containing phosphorus vapor. The present process may also be modified, particularly in the continuous treatment of a stream of particles of the amorphous boron phosphide to permit the flowing of the stream of particles through a tube into which phosphorus vapor is passed, either concurrently or counter-currently, while maintaining the above-described conditions of temperature and partial pressure of the phosphorus.

In another modification of the invention the amorphous boron phosphide is pressed or otherwise formed into shaped pieces by the incorporation therewith of an organic refractory material, for example, alumina, zirconia, hafnia, silica, beryllia, titania, thoria, and/or additive metals, for example, iron, nickel, chromium, cobalt, niobium, tantalum, titanium, zirconium and molybdenum, or combustions thereof. A binder such as the silica binders, for example, water glass, as described above, may be employed similarly to the method described above. When the combination compositions of the amorphous boron phosphide with alumina or other refractory is treated as described above, the amorphous boron phosphide which is present undergoes crystallization, while the metals and refractories, such as alumina, remain unchanged and consequently form an intimate admixture and crystalline combination with the boron phosphide in the finished article.

It is an advantage of the present invention that curved shapes may readily be manufactured in a form which is characterized by unusually high strength. The amorphous boron phosphide used as the starting material in the present process is a very weak material which can only with difficulty be pressed or formed into shaped objects, and which usually requires a binder in order to accomplish any effective consolidation of the amorphous particles into a shaped piece. However, it has been found that the present recrystallization of the amorphous boron phosphide to a cubic crystalline form at the same time results in a modification of the gross structure of the particles to provide interlocking of the crystals. This is particularly advantageous in the fabrication of curved shapes since the interlocking of the crystals results in the production of a smooth curved surface. This effect is advantageous in the fabrication of parts which must undergo great thermal stress and shock, for example, in the nose cones of rockets and missiles. The present type of crystalline boron phosphide has also been found to be stable to combustion gases without appreciable attack of the boron phosphide. Therefore, the curved shapes which are made by the present invention are especially useful as combustion chambers and throats in which a rocket fuel, for example diborane and an oxidizing agent, such as fuming nitric acid, are co-mingled in order to provide a controlled combustion which releases a tremendous amount of energy, for example in the propulsion of a rocket.

The crystalline form of boron phosphide is resistant to oxidation when exposed for 2 minutes to an oxy-hydrogen flame giving a temperature of 4,000° F. In addition it has been found that a sample at this temperature can be subjected to an oxygen jet from a cutting torch without appreciable deterioration of the crystalline boron phosphide.

While this material is somewhat less resistant to oxidation while it is being heated up to such high temperatures, the provision of a neutral or reducing atmosphere overcomes any tendency towards deterioration.

The following examples illustrate specific embodiment of the present invention.

*Example 1*

Amorphous boron phosphide as a brown powder of 100 mesh particle size was loaded in a graphite crucible which was placed in a quartz tube. The tube was evacuated in order to remove substantially all of the oxygen. The sample was then heated in the presence of at least 10 mm. partial pressure of phosphorus vapor to a temperature of about 1,800° F. The vapor pressure of the phosphorus was at least 400 mm. under these conditions. After about one hour of treatment, the sample was removed from the furnace and cooled. The sample was subjected to X-ray diffraction analysis and found to be characterized by a cubic crystalline structure having a unit cell length of about 4.547 Angstrom units. The material had also increased greatly in hardness, with the hardness of the product lying between 8 and 9 on Moh's scale (diamond=10). The product was almost as hard as silicon carbide and can be used to scratch or abrade quartz, porcelain, agate and cemented tungsten. The product was also resistant to the attack of nitric acid, sulfuric acid, hydrochloric acid and aqua regia and was resistant to decomposition during intermittent heating at temperatures up to about 5,400° F.

*Example 2*

A nose cone for a space missile was formed by tamping amorphous boron phosphide into the desired shape, using a wooden form as the outer mold and a conical block as the inner guide. This curved shaped object was placed in a tube furnace. The atmosphere in the furnace was first cleared of oxygen by flushing with nitrogen, after which the furnace was brought up to a temperature of about 2,200° F. Phosphorus vapor was passed through the tube in order to maintain a partial pressure of phosphorus of about 700 mm. with the remainder of the atmosphere being argon. After a crystallization period of about one hour, the shaped nose piece was cooled in the tube and was then removed from the furnace. The finished product was extremely hard and resistant against attack by abrasive particles as was shown by its abiilty to withstand sand blasting.

The cubic crystalline form of boron phosphide is characterized by unusally high temperature stability. It has been found that this material may be subjected for brief periods to temperatures of about 6,000° F. This material is also resistant to attack by any known liquid chemical reagents, including the mineral acids, for example, sulfuric acid, hydrochloric acid and fuming nitric acid, as well as basic materials such as caustic and hydrazine. Aqua regia does not attack the crystalline form of boron phosphide and an oxy-hydrogen flame directed intermittently against the crystalline product does not cause any appreciable oxidation.

The inert character of crystalline boron phosphide as well as its high temperature stability, makes this a useful material in the fabrication of rocket and jet fittings and hardware. Examples of some of the parts which can thus be fabricated from crystalline boron phosphide include corrosion-resistant combustion chambers and liners for various vessels, including fuel tanks which are to be used to store both liquid and solid propellant fuels and oxidants, including ammonium perchlorate, fuming nitric acid and alkyl boron compounds, such as ethyl alkylated pentaborane and ethyl alkylated decaborane. Missile elements which must withstand extreme abrasion and high temperature shock may also be manufactured from crystalline boron phosphide; examples of such fittings include nose cones and rocket nozzles. Other hardware items which must withstand the abrasion of high temperature gas streams and are therefore preferably made from crystalline boron phosphide include jet elevators (also called jetevators) and other jet vanes, elevators and control surfaces. It is an advantage of the present invention that curved shapes may readily be manufactured in a form which is characterized by high strength. The formation of the crystalline modification of boron phosphide results in the production of a gross structure of the particles to provide interlocking of the crystallites. This is particularly advantageous in the fabrication of curved shapes since the interlocking of the crystallites results in the production of a smooth curved surface. This effect is advantageous in the fabrication of parts which must undergo great thermal stress and shock, for example, in the nose cones of rockets and missiles. The present type crystalline boron phosphide has also been found to be stable to combustion gases without appreciable attack of the boron phosphide. Therefore, the curved shapes which are made from boron phosphide are especially advantageous as combustion chambers and throats in which a rocket fuel, for example, diborane and an oxidizing agent such as fuming nitric acid are comingled in order to provide a controlled combustion which releases a very large amount of energy, such as, in the propulsion of a rocket.

Since crystalline boron phosphide is also a very hard material having a hardness of Moh's scale between 8 and 9 (diamond=10), this material is particularly suitable for the manufacture of impellers for fuel pumps in missiles, rockets and space ships and other moving parts. The crystalline material is quite light, having a particle density of 2.94 (theoretical 2.97).

The high temperature stability of crystalline boron phosphide makes this material particularly valuable in the fabrication of parts for turbines, including both combustion turbines and steam turbines. Specific parts thus contemplated include the nozzles for either a steam or combustion gas stream (the latter possibly including fly ash and metallic particles therein) and also the turbine blades, vanes, and bearings.

The inert character of crystalline boron phosphide in corrosive atmospheres makes this material a valuable source for the manufacture of steam jet ejectors and rupture discs which must maintain their form and strength at a constant value despite exposure to corrosive atmospheres, such as in petroleum refining.

Because of the hardness of crystalline boron phosphide, this material is especially adapted for use as an abrasive material or cutting tool, either in the form of a finely-divided product or in a fabricated form, for example as a cutting tool in a lathe. The particulate form of crystalline boron phosphide may also be used in the manufacture of grinding tools or wheels in which the particles are secured in a resinous binder. The finely divided form of crystalline boron phosphide, because of its abrasive character, is also suitable for use in the manufacture of sand paper and other abrasive products. In this relationship the crystalline material is secured to a backing of paper, cloth, etc. by the use of a suitable glue, cement or resin. Another application for the crystalline boron phosphide arising from its wear-resistant properties is as wear plates, for example, in grinders and crushers intended for size reduction of minerals, rocks, etc. and in the grinding of pulp wood in the production of paper.

The chemical inertness and high temperature stability of crystalline boron phosphide makes this a valuable material in the febrication of chemical apparatus, such as crucibles and reactors intended particularly for use at high temperatures, since this material is resistant against temperatures of up to 6,000° F. Agitator arms may also suitably be fabricated from this material and burners such as in the manufacture of acetylene from natural gas, phosphorus pentoxide from phosphorus are typical examples of elements which may be fabricated from the crystalline form of boron phosphide. Such burners may also be made in the form of heat exchangers, since it is well known that burners must operate at very high temperatures because of the radiation effects such as in the combustion of elemental phosphorus to phosphorous pentoxide by air or oxygen.

Another field of application of the crystalline form of boron phosphide is as a nuclear reactor shield in the operation of atomic piles and other reactors in the field of atomic energy.

The crystalline boron phosphide that is made by the process of the present invention is particularly advantageous in the manufacture of semi-conductors.

It has been found that this crystalline material is characterized by a negative temperature coefficient of resistance which makes the material a suitable component in the manufacture of various semi-conductor products particularly for high temperature service. It has been found by optical measurements on cubic crystalline boron phosphide that it has a forbidden energy gap of about 6.8 electron volts. For example, rectifiers, transistors, and other barrier-layer devices may be made from the crystalline boron phosphide, together with other crystalline materials and with the development of suitable controlled impurities if desired, for example, elements of groups II or VI of the periodic table.

The semi-conductor properties of the crystalline form of boron phosphide are also shown by the optical characteristic of this cubic crystalline material. An unusually effective field of utilization therefore is an optical window in test instruments and in guided missiles and space ships. Such a window may also be fabricated with an external boron phosphide protective layer deposited upon a base of quartz or other transmissive material. It has been found that the cubic crystalline form of boron phosphide is characterized by an unexpected transmissive power for radiation of characteristic wave lengths (such as from about 1,850 Angstroms to about 8,000 Angstroms). This permits the fabrication of a window which is to be subjected to high temperature and high pressure conditions, for example, as an observation port in a furnace or nuclear reactor or as an observation port for a space ship or missile which is intended to approach quite close to the sun or other stars. In this relationship, it is thus possible to pass the desired characteristic band of radiation through the window of crystalline boron phosphide while at the same time providing for the maintenance of erosion resistance of such a window even when it is subjected to an ambient temperature of 5,000° F. or 6,000° F.

Another field of utilization of crystalline boron phosphide is as a radiation meter. The imposition of certain specific bands of strong radiation upon the cubic crystalline form of boron phosphide results in the characteristic electrical modification of the material which is readily measured by conventional electrical procedures. Thus, it is possible to provide a radiation meter which can withstand extreme conditions of strong radiation, for example in a nuclear reactor, together with high temperature and pressure without failure of the meter element.

Since the cubic crystalline form of boron phosphide may be fabricated in order to achieve both dense (e.g., nearly theoretical density) and porous surfaces, a number of fields of application are based upon this property. For example, the dense form of crystalline boron phosphide may be used to fabricate a solid nose cone of needle form or blunt form intended for a guided missile. This crystalline boron phosphide is highly resistant against heating and thus withstands the attack by erosive gases to which a missile nose cone is subjected upon re-entry into the atmosphere. Under such conditions, speeds of up to 25,000 miles per hour may be encountered, together with surface temperatures in the order of 10,000° F. or above, and it is consequently imperative that a thermally stable material be available for this application, even though the extreme conditions may exist for only a short time, such as about 30 seconds.

A number of fabrication methods are available to produce the above-described manufactured products from crystalline boron phosphide. If it is desired to employ the crystalline material in powder form, one of the desirable methods is the hot pressing technique in which the powder is placed in a die of the desired form and subjected to an elevated temperature, for example from 1,000° F. to 6,000° F. for a sufficient time to consolidate the crystalline material and effect sufficient sintering to achieve the desired density. The pressure is generally from about 500 to about 20,000 p.s.i. A flux or bonding agent may also be employed in this relationship; suitable materials for this purpose include one or more of the metals: iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals. Inorganic compounds having fluxing or bonding properties, such as the borates or phosphates, e.g., the alkali borates and phosphates may also be employed. Boron phosphate may also be employed as a bonding agent which forms a glassy matrix having the property of securing the crystalline particles of boron phosphide. Another additive which may be employed in the pressing operation is asbestos, since it has been found that when the composite article is later subjected to a vacuum heating or oxidizing condition, such as a combustion gas flame at about 6,000° F., the asbestos is vaporized leaving the crystalline boron phosphide which is of utility in the use of sweat or transpiration cooling. This method is employed for cooling missile, rocket or space ship external and internal surfaces which are subjected to high temperatures. The porous objects having a wall of crystalline boron phosphide permit the exudation of a liquid, such as water, alcohol or the liquid fuel through the porous wall so that the liquid, upon passing through the porous boron phosphide is evaporated to provide an unusually efficient cooling effect.

The above-described porous form of fabricated boron phosphide is also of utility as a filter element, particularly for corrosive uses. Thus, in the fuel system for a rocket or missile, it is necessary to filter the fuel and/or oxidizing agent in order to avoid clogging the line. This presents a difficult problem in the case of corrosive agents, such as fuming nitric acid which attacks most metals. However, when a porous boron phosphide filter is inserted in the fuel or oxidant line, this filtering effect is readily accomplished without the danger of corrosion or dissolution of the crystalline boron phosphide.

In the hot pressing operation it may also be desirable to control phase changes of the boron phosphide by the use of specific additives. For example, transition temperature changes may be controlled by the addition of silicon carbide, zinc oxide and other crystalline materials to aid in the pressing operation.

Cold pressing or indenting of the crystalline boron phosphide is another fabrication method which may be employed, particularly with the use of a binder such as sodium silicate for the fabrication of various parts and fittings. The pressure utilized may be up to 200,000 p.s.i. Suitable metallic additives which may be employed, together with the crystalline boron phosphide include iron, nickel, cobalt, chromium, niobium, tantalum, titanium, zirconium, tungsten, molybdenum and hafnium, while refractory and insulating oxides, such as alumina, zirconia, hafnia, silica, beryllia, titania, thoria may also be employed singly or in combination, including combinations with the said metals. The cold pressed material is subsequently treated in various ways, such as by sintering, reducing or partially oxidizing the fabricated article, in which case the boron phosphide may also undergo a number of controlled modifications. The use of partial oxidation of the cold pressed material also permits the development of porosity, such as by the employment of additives exemplified by naphthalene and other organic compounds as well as cork and asbestos, since the heating and oxidation results in the burning out or transformation of such binder constituents to a glassy or crystalline matrix, which together with the change in the said metals or oxide constituents serves to secure and bond the boron phosphide particles.

If a minor proportion of elemental boron is employed as an additive with the crystalline boron phosphide in either hot pressing or cold pressing, the fabricated part may be subjected to a phosphorization treatment in which the piece is subjected to the vapor of elemental phosphorus or another phosphorus compound, for example phosphine, in order to consolidate the fabricated part with the transformation of the boron binding agent to boron phosphide.

If it is desired to make use of the cubic crystalline form of boron phosphate as a hardening element in a metallic base, for example, iron in the production of wear plate, the boron phosphide may be produced directly in such a metallic matrix. The base metals which may be employed in this relationship include the group of aluminum, magnesium, copper, titanium, chromium, manganese, vanadium, zirconium, molybdenum, tantalum, thorium, iron, nickel, lead, tin, antimony, bismuth and zinc. Articles of this type are useful to withstand wear and abrasion such as in the manufacture of a chute for a sand or other minerals. Another use for such a reinforced metal is as a baffle in a steam turbine. The above described process for the reaction of a phosphorus source such as ferrophosphorus and a boron source such as ferro-boron at elevated temperature results in the production of the desired cubic crystalline form of boron phosphide which is obtained in dispersed form in the iron matrix.

Pack diffusion is another method for applying crystalline boron phosphide to desired metallic or ceramic parts. In this method, particles of the crystalline boron phosphide are packed around the desired metallic or ceramic parts and the entire mixture subjected to a high temperature, e.g., about 1500° F. to 6000° F. for a suitable period of time to enable diffusion of the boron phosphide to take place into the desired parts and fittings.

If it is desired to coat or plate the crystalline boron phosphide on various substrates of metal or refractory parts, particularly when intricate sections are involved, a flame spraying technique is desirable. In this method, a high temperature flame such as a reducing oxy-hydrogen flame is provided with finely-divided particles of crystalline boron phosphide so that the impingement of the flame upon the desired prototype base parts of metal or refractory coats the parts with a uniform and dense deposit of the crystalline boron phosphide.

Another method which may be applied is the deposition of a coating of crystalline boron phosphide by electrophoresis. This method is particularly suited for precision coating of complicated shapes. Metals and oxides selected from the group consisting of iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals may also be applied in combination with the crystalline boron phosphide by the electrophoretic method. In this process an aqueous suspension of the crystalline boron phosphide and the desired metal or oxide is prepared, preferably with particle size ranges of from 1 to 10 microns. A suspending or dispersing agent such as carboxymethylcellulose may also be present. The suspension preparation is then deposited upon the prototype of graphite, a metal or a fine screen metal form utilizing a plating voltage of the order of 6 to 100 volts direct current. A uniform coating of the boron phosphide, optionally with a metal and oxide therewith of the group set forth above is thus applied to the base prototype. The coating is subsequently air dried and is then treated by a low temperature hydrogen reduction in the case of the metallic oxides. Hydrogen reduction is not necessary with coatings of the metal powders, and the boron phosphide is unaffected by such treatment. The electrophoretic coating is next densified by peening, rolling or by isostatic pressing, the latter method being particularly convenient for small items. A final step after densification is a sintering of the coating to provide a uniform and strong coating which is resistant to chemicals and to abrasion.

A mechanical method of deposition which is available for the fabrication of external layers of crystalline boron phosphide is that of slurry deposition. In this method the finely-divided crystalline boron phosphide is dispersed in a liquid vehicle such as water, optionally with a dispersing or suspending agent such as carboxymethylcellulose. Additive materials, such as metals, for example, iron, nickel, cobalt, chromium, niobium, tantalum, titanium, zirconium, molybdenum and hafnium and finely-divided refractories, e.g., alumina, zirconia, hafnia, silica, beryllia, titania, and thoria may also be present.

The forms upon which the slurry is to be deposited are made wtih a porous structure, for example, from metal powders which have been loosely consolidated to the desired shape or by the use of a fine mesh screen form having the shape of the desired object. Such a porous prototype is suspended in the liquid vehicle which is then subjected to high pressures of the order of 10,000 to 50,000 pounds per square inch. Provision is made for the liquid vehicle to be removed from the interior of the mold or prototype piece which may have an intricate form, or may consist of a simple flat plate as may be desired. As a result of the imposition of pressure upon the dispersion of the crystalline boron phosphide, the slurry is uniformly pressed against the prototype with the result that an interlocking crystalline structure is obtained without internal voids or bridges. When the desired thickness of crystalline boron phosphide has thus been formed, the coating may be subjected to further mechanical treatment. For example, the coating thus obtained by slurry dispersion may be densified by peening, rolling or isostatic pressing. Finally the deposited coating of crystalline boron phosphide, together with any additives is sintered to consolidate the coating to a dense form.

Another method of fabrication which is of utility in forming bodies from crystalline boron phosphide is the slip casting technique. In this method a slurry is made of the crystalline boron phosphide, together with any desired additive material, such as finely-divided refractories, e.g., alumina, zirconia, hafnia, silica, beryllia, titania, and thoria. This mixture is then used in conventional ceramic slip casting techniques to obtain the desired shapes and fittings in a green form which is then fired, packed or sintered to consolidate the crystalline particles.

What is claimed is:
1. Proccess for the crystallization of amorphous boron phosphide which comprises heating amorphous boron phosphide to a temperature above 1,400° F. in the presence of phosphorus vapor.

2. Process for the crystallization of amorphous boron phosphide which comprises heating the said amorphous boron phosphide to a temperature of from 1,400° F. to 2,800° F. in the presence of phosphorus vapor.

3. Process for the formation of curved objects which comprises pressing a mass of amorphous boron phosphide into the desired shape, and thereafter heating the said object at a temperature of from 1,400° F. to 2,800° F., while contacting the said object with vapors of elemental phosphorus with a partial pressure of at least 10 mm. of phosphorus.

4. Process for the formation of shaped objects which comprises forming a mass of amorphous boron phosphide into the desired shape, and thereafter heating the said object at a temperature of from 1,400° F. to 2,800° F., while contacting the said object with vapors of elemental phosphorus with a partial pressure of at least 10 mm. of phosphorus.

References Cited in the file of this patent
UNITED STATES PATENTS

| | | |
|---|---|---|
| 2,467,647 | Alexander | Apr. 19, 1949 |
| 2,759,861 | Collins et al. | Aug. 21, 1956 |
| 2,798,989 | Welker | July 9, 1957 |
| 2,832,672 | Fetterley et al. | Apr. 29, 1958 |